United States Patent
Gulbransen

(10) Patent No.: US 9,304,220 B2
(45) Date of Patent: Apr. 5, 2016

(54) HANDLING EQUIPMENT FAILURE IN A SUBTERRANEAN SURVEY DATA ACQUISITION NETWORK

(75) Inventor: Espen Gulbransen, Oslo (NO)

(73) Assignee: WESTERNGECO L.L.C., Houston, TX (US)

( * ) Notice: Subject to any disclaimer, the term of this patent is extended or adjusted under 35 U.S.C. 154(b) by 1770 days.

(21) Appl. No.: 12/342,813

(22) Filed: Dec. 23, 2008

(65) Prior Publication Data

US 2010/0157728 A1    Jun. 24, 2010

(51) Int. Cl.
  *G01V 1/22*  (2006.01)
  *G01V 1/24*  (2006.01)
  *G01V 1/38*  (2006.01)

(52) U.S. Cl.
  CPC .............. *G01V 1/24* (2013.01); *G01V 1/3808* (2013.01)

(58) Field of Classification Search
  CPC ............................ G01V 1/3808; G01V 1/24
  USPC .................... 307/147; 367/38, 50, 59, 20, 76; 702/14; 707/103 X
  See application file for complete search history.

(56) References Cited

U.S. PATENT DOCUMENTS

| | | | |
|---|---|---|---|
| 5,206,837 A * | 4/1993 | Beasley et al. .................. | 367/38 |
| 6,199,422 B1 | 3/2001 | Boerhout et al. | |
| 6,219,620 B1 * | 4/2001 | Park et al. ....................... | 702/14 |
| 6,772,082 B2 | 8/2004 | van der Geest et al. | |
| 7,012,853 B2 | 3/2006 | Iseli et al. | |
| 7,391,674 B2 | 6/2008 | Welker | |
| 2003/0117025 A1 * | 6/2003 | Rouquette ..................... | 307/147 |
| 2006/0155758 A1 * | 7/2006 | Arnegaard et al. ....... | 707/103 X |

OTHER PUBLICATIONS

PCT Search Report, dated Jul. 30, 2010, Application No. PCT/US2009/068485.

* cited by examiner

*Primary Examiner* — Daniel L Murphy

(57) ABSTRACT

A technique includes generating a data stream that contains data acquired by nodes of a subterranean survey data acquisition network and introducing data into the data stream, which describes an equipment failure that occurred in the network.

14 Claims, 6 Drawing Sheets

HANDLING EQUIPMENT FAILURE IN A SUBTERRANEAN SURVEY DATA ACQUISITION NETWORK

BACKGROUND

The invention generally relates to handling equipment failure in a subterranean survey data acquisition network.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes generating a data stream that contains data acquired by nodes of a subterranean survey data acquisition network and introducing data into the data stream, which describes an equipment failure that occurred in the network.

In another embodiment of the invention, a system includes a seismic data acquisition network and a circuit. The subterranean survey data acquisition network includes acquisition nodes to generate a data stream. The circuit is adapted to, in response to an equipment failure occurring in the network, introduce data into the data stream, which describes the failure.

Advantages and other features of the invention will become apparent from the following drawing, description and claims.

DETAILED DESCRIPTION

Figure 1:
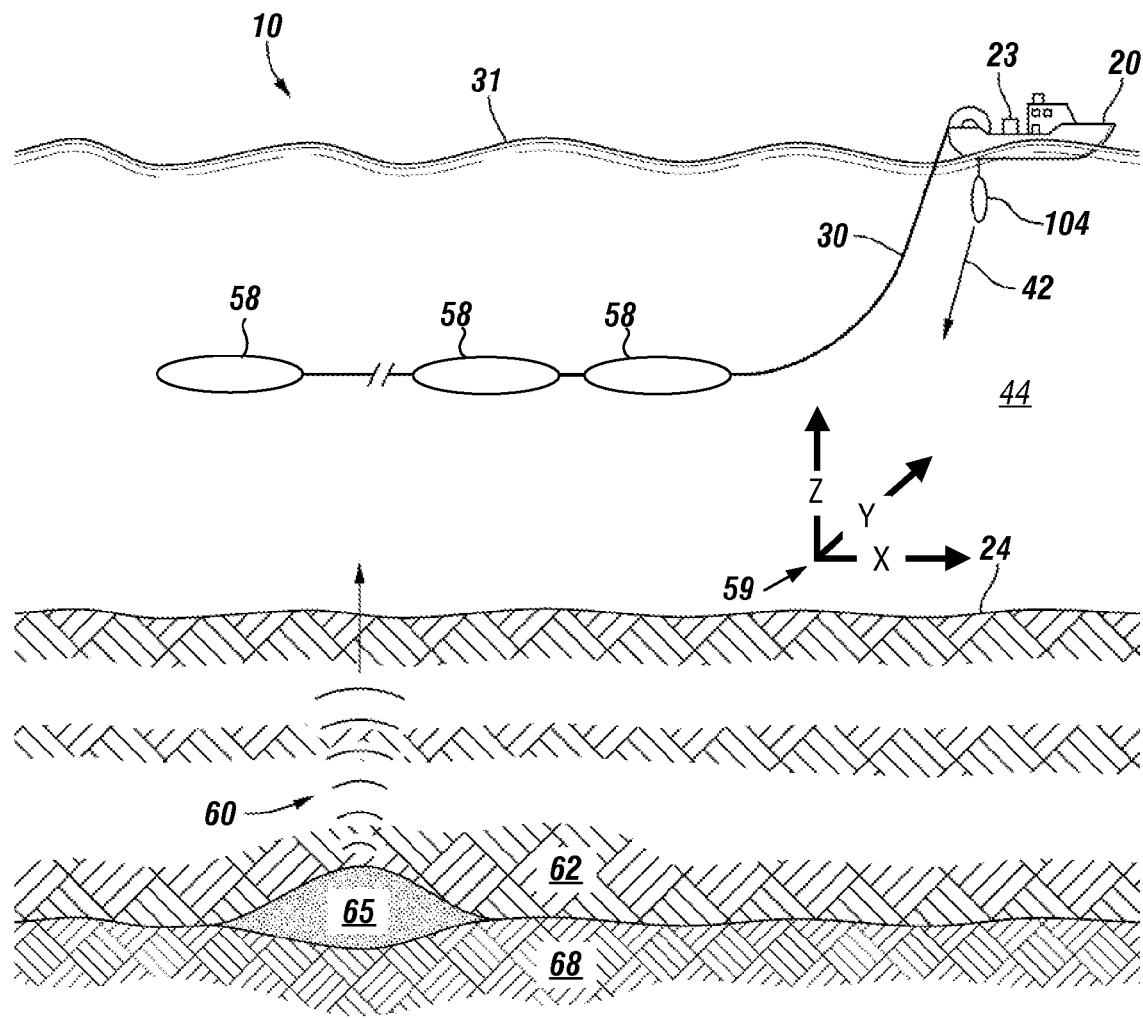
FIG. 1 is a schematic diagram of a towed marine seismic data acquisition system according to an embodiment of the invention.

FIG. 1 depicts an embodiment 10 of a marine seismic data acquisition system in accordance with some embodiments of the invention. In the system 10, a survey vessel 20 tows one or more seismic streamers 30 (one streamer 30 being depicted in FIG. 1) behind the vessel 20. The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors 58 that record seismic signals.

In accordance with some embodiments of the invention, the seismic sensors 58 may be pressure sensors, and in other embodiments of the invention, the seismic sensors 58 may be multi-component seismic sensors, each of which is capable of detecting a pressure wavefield and at least one component of a particle motion that is associated with acoustic signals that are proximate to the multi-component seismic sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the seismic sensor 58 may include one or more hydrophones, geophones, particle displacement sensors, particle velocity sensors, accelerometers, pressure gradient sensors, or combinations thereof.

For example, in accordance with some embodiments of the invention, a seismic sensor 58 may include a hydrophone for measuring pressure and three orthogonally-aligned accelerometers to measure three corresponding orthogonal components of particle velocity and/or acceleration near the seismic sensor 58. It is noted that the multi-component seismic sensor may be implemented as a single device (as depicted in FIG. 1) or may be implemented as a plurality of devices, depending on the particular embodiment of the invention. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, a particular point, seismic data indicative of the pressure data with respect to the inline direction.

The marine seismic data acquisition system 10 includes a seismic source 104 that may be formed from one or more seismic source elements, such as air guns, for example. As the seismic streamers 30 are towed behind the survey vessel 20, acoustic signals 42 (an exemplary acoustic signal 42 being depicted in FIG. 1), often referred to as "shots," are produced by the seismic source and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 produce corresponding reflected acoustic signals, or pressure waves 60, which are sensed by the seismic sensors 58. It is noted that the pressure waves that are received and sensed by the seismic sensors 58 include "up going" pressure waves that propagate to the sensors 58 without reflection, as well as "down going" pressure waves that are produced by reflections of the pressure waves 60 from an air-water boundary 31.

The seismic sensors 58 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular multi-component seismic sensor may provide a trace, which corresponds to a measure of a pressure wavefield by its hydrophone; and the multicomponent sensor may provide one or more traces that correspond to one or more components of particle motion, which are measured by its accelerometers.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23.

Figure 2:
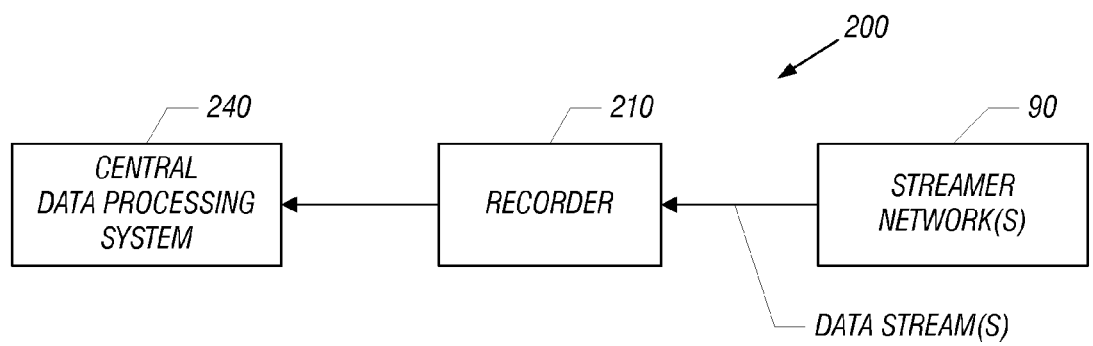
FIG. 2 is a schematic diagram of a processing architecture for the system of FIG. 1 according to an embodiment of the invention.

Referring to FIG. 2 in conjunction with FIG. 1, in accordance with some embodiments of the invention, the system 10 of FIG. 1 may employ an exemplary architecture 200 that includes one or more streamer networks 90 (one for each streamer 30) and a recorder 210 (part of the onboard signal processing unit 23, for example). The recorder 210 communicates with the streamer network(s) 90 for purposes of retrieving seismic data from the streamer(s) 30 and recording the data. More specifically, each streamer network 90 includes acquisition nodes that acquire data that is inserted into a data stream that is communicated to the recorder 210. For example, a given streamer network 90 includes nodes that are associated with seismic sensors 58, and the data stream from the streamer network 90 includes pressure and/or multicomponent seismic data acquired by the seismic sensors 58. The recorded data streams may be further processed by a central data processing system 240 for such purposes as noise attenuation, deghosting, inversion, etc.

Figure 3:
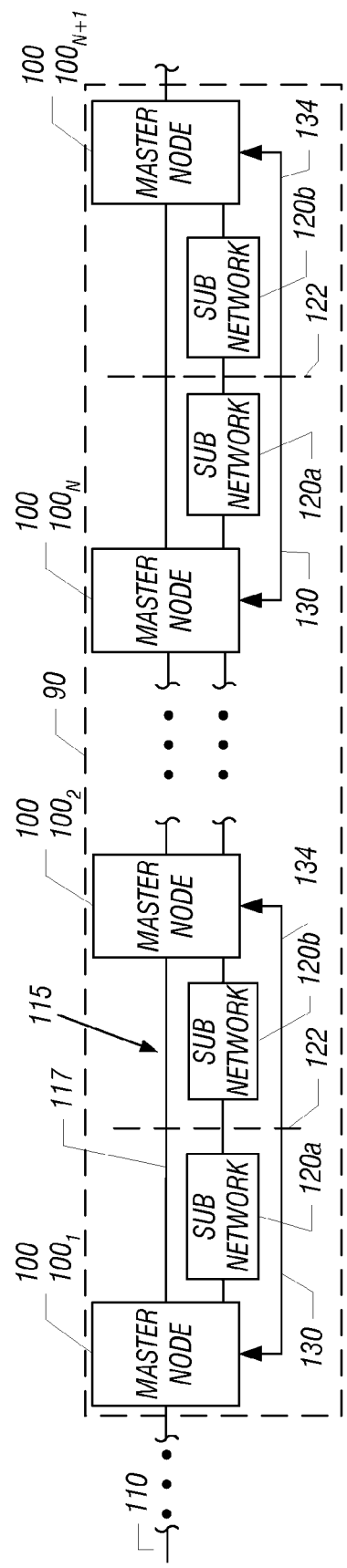
FIG. 3 is schematic diagram illustrating a seismic data acquisition network for a streamer according to an embodiment of the invention.

FIG. 3 is a schematic diagram of an exemplary streamer network 90 in accordance with some embodiments of the invention. In general, the streamer network 90 includes master nodes 100 (exemplary master nodes $100_1$, $100_2$, ... $100_N$ and $100_{N-1}$ being depicted in FIG. 3) that are, in general, uniformly distributed along the length of the streamer 30. As a more specific example, the master nodes 100 may be coupled together by optical fibers 117 as part of an Ethernet network. In general, if a particular master node 100 has improperly booted up or is otherwise not available for communication, a bypass switch of the master node 100 is closed, which renders the master node 100 transparent to the other master nodes 100 of the network 90.

Each master node 100 is associated and controls communication from an associated subnetwork, which includes seismic data acquisition nodes. For example, as depicted in FIG. 3, the master node $100_1$ controls communication with a subnetwork 120a, and the master node $100_2$ controls communication with a subnetwork 120b. As an example, some of the nodes of the subnetworks 120a and 120b may be associated with seismic sensors, such as pressure sensors or multicomponent sensors, which acquire seismic data. Other nodes of the subnetworks 120a and 120b may be associated with other streamer functions, such as nodes associated with depth or bird-type control devices, for example.

As depicted in FIG. 3, in accordance with some embodiments of the invention, adjacent subnetworks, such as the subnetworks 120a and 120b, may be connected together. Although the subnetworks 120a and 120b are connected together, in general, the master node $100_1$ controls communication with the subnetwork 120a, and the master node $100_2$ controls communication with the subnetwork 120b. Due to their connection, however, the nodes of either subnetwork 120a or 120b may communicate with the other master node 100 should communication through the subnetwork fail, as further described below. Thus, in general, assuming no failure occurs in either subnetwork 120a or 120b, the subnetwork 120a communicates with one of the master nodes 100, and the subnetwork 120b communicates with the other master node 100, as indicated by the respective communication flows 130 and 134.

As further described herein, an equipment failure in the streamer network 90 may disrupt communication through part of the network 90 and/or may disable one of the seismic data acquisition nodes. As a result, acquired data from one or more of the acquisition nodes may not be available. Because higher level processing equipment (such as the recorder 210 (FIG. 2) or the central data processing system 240 (FIG. 2), as examples) expect the data stream to contain data from all of the acquisition nodes, the architecture 200 (FIG. 2) is configured to insert two types of data into the data stream should an equipment failure in the network 90 occur: self-describing data that describes the type of equipment failure; and emulated data, which is data that is substituted in place of the actual acquired data from the failed equipment. It is noted that the emulated data may be data that is predicted to have been acquired by the failed equipment, may be "dummy data" having a predetermined pattern or may be data obtained by averaging acquired data from adjacent sensors. Thus, many variations are contemplated and are within the scope of the appended claims.

The self-describing data may be, as an example, a predetermined bit pattern, which is indicative of a particular failure. For example, the data stream that is provided by the streamer network 90 may be divided into time slices, with each time slice being allocated to a particular sensor. Each time slot may include, for example, a particular bit field that is dedicated to indicating whether or not the data from the sensor is valid. Thus, a predetermined bit pattern may indicate that the node associated with the sensor has failed, and thus, the "acquired" data in the time slot is actually the emulated data. As another example, another predetermined bit pattern may indicate that physical break(s) in the network prevented the data acquired by the node from being communicated. By indicating the type of equipment failure and including the emulated data, the offset in the data stream for the failed sensor is preserved, thereby accommodating higher level processing of the data stream.

Figure 4:
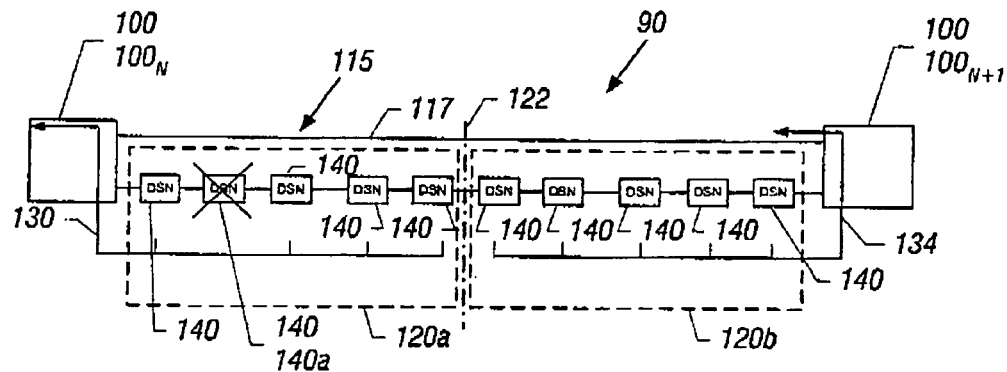
FIGS. 4, 7 and 8 are schematic diagrams of the network of FIG. 3 illustrating exemplary equipment failures of the network according to embodiments of the invention.

As a more specific example, FIG. 4 depicts the streamer network 90 for the scenario in which an acquisition node 140a of the subnetwork 120a has failed. In general, the node 140a is one of a series of nodes of the network 120a, and likewise, the network 120b has a series of nodes 140. For this example, the nodes 140 of the network 120a communicate with the master node $100_N$, and the nodes 140 of the network 120b communicate with the master node $100_{N+1}$.

The failure of the node 140a does not disrupt communication through the network 120a. Thus, communication still occurs with the nodes 140 along a communication flow 130 to the master node $100_N$, and communication of the data from the nodes 140 still occurs through a communication flow 134 to the master node $100_{N+1}$. However, for this example, the master node $100_N$ detects a problem with the node 140a on its network 120a. For example, the master node $100_N$ may not be able to read data from the node 140a, the sensor associated with the node 140a has failed, etc. Upon detecting the failure of the node 140a, the master node $100_N$ inserts self-describing data into the data stream, which is indicative of the particular type of failure of the node 140a and inserts the emulated data into the data stream for the failed node 140a.

Figure 5:
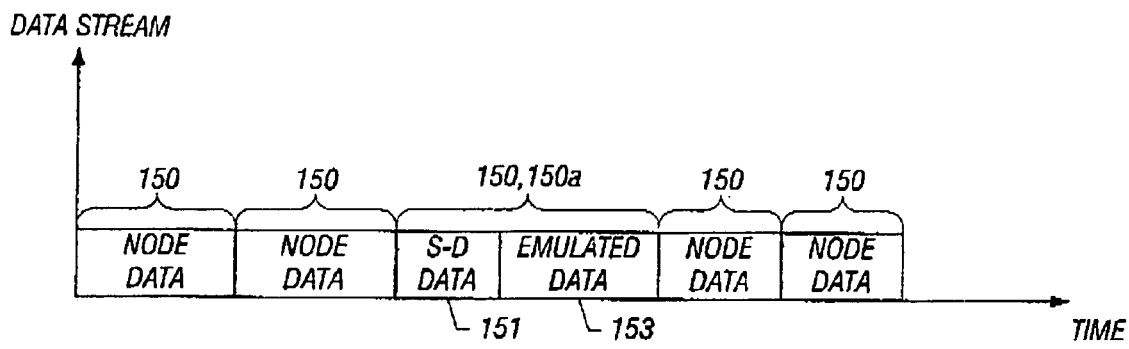
FIG. 5 is a waveform illustrating a data stream generated by the network of FIG. 3 according to an embodiment of the invention.

More specifically, referring to FIG. 5, in accordance with some embodiments of the invention, the data stream that is produced by reading data from the acquisition nodes 140 includes data fields 150, each of which is associated with a particular node 140. For this example, a field 150a is associated with the failed node 140a. Thus, the master node $100_N$ inserts self-describing data 151 and emulated data 153 for the data field 150a in the data stream from the streamer 30.

It is noted that in accordance with other embodiments of the invention, a component of the architecture 200 other than a master node 100 may insert the self-describing and emulated data. In this regard, in accordance with other embodiments of the invention, a specialized master node 100 or the recorder 210 may insert this data. Thus, the self-describing and emulated data may be inserted at various hierarchical levels within the architecture 200, as many variations are contemplated and are within the scope of the appended claims.

As yet another example, in accordance with some embodiments of the invention, if a particular acquisition node 140 partially fails, the acquisition node 140 itself may insert the self-describing and emulated data. As a non-limiting example, one or more sensors that are internal to the node 140 may fail or for some reason may not be able to provide data, and for this scenario, the node 140 may insert the self-describing and emulated data.

Figure 6:
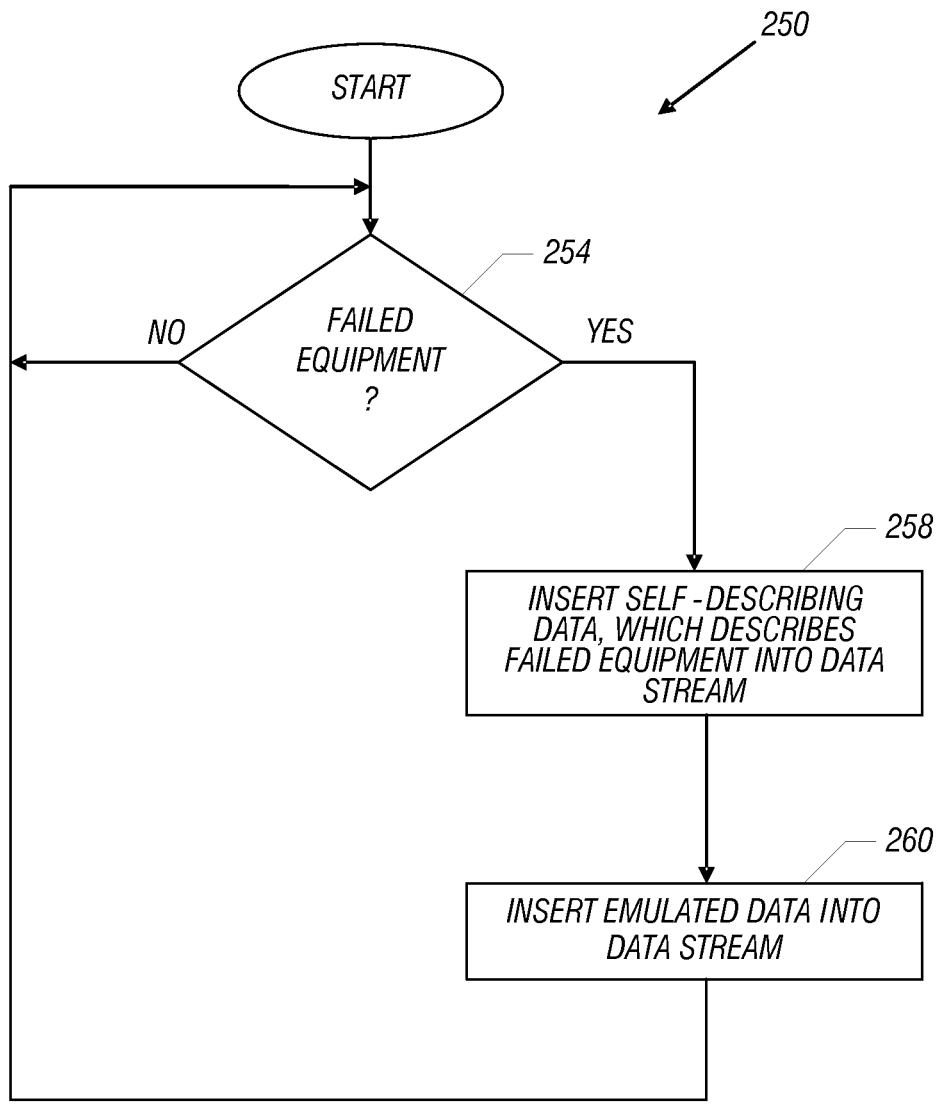
FIG. 6 is a flow diagram depicting a corrective action technique to address equipment failure in a seismic data acquisition network according to an embodiment of the invention.

Referring to FIG. 6, to summarize, a technique 250 in accordance with some embodiments of the invention includes detecting (diamond 254) whether equipment of a seismic data acquisition network has failed. If so, self-describing data is inserted into the data stream, which describes the failed equipment. Additionally, the technique 250 includes inserting emulated data associated with the failed equipment into the data stream, pursuant to block 260.

Figure 7:
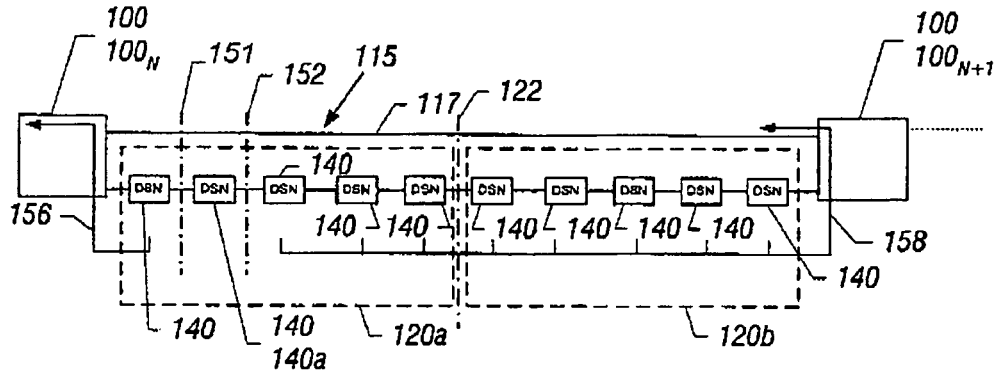

Equipment failures other than node failures may occur. As a non-limiting example, FIG. 7 depicts a network equipment failure due to more than one data link error. More specifically, FIG. 7 depicts a scenario in which physical discontinuities 151 and 152 occur at either side of an exemplary node 140a of the network 120a. Due to this occurrence, communication is prevented in both directions from the node 140a. Therefore, although a communication 158 may be established to route some of the nodes 140 into the same communication path as the nodes 140 of the network 120b, the node 140a remains isolated. It is noted that one or more of the many nodes 140 of the network 120a may be routed to the master node $100_N$, as depicted in FIG. 7. Upon detecting loss of communication with the node 140a, the master node $100_N$ (or possibly other entity) generates the self-describing data and the emulated data. It is noted that the physical discontinuities 151 and 152 may be determined in a sequence that involves adjacent master node $100_N$ and $100_{N+1}$ both attempting to communicate with the node 140a, and after the failure of both these master nodes $100_N$ and $100_{N+1}$ failing to communicate, a determination is then made that two data link errors have occurred.

Figure 8:
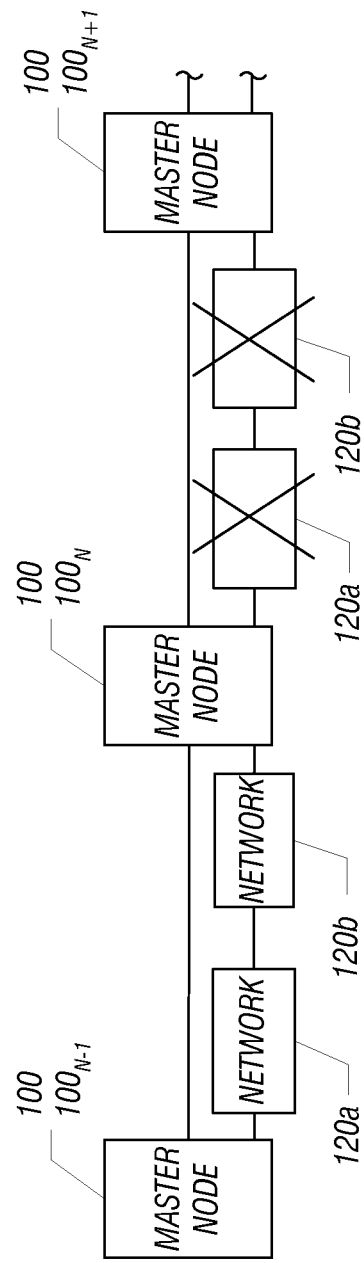

As another example, FIG. 8 depicts a power failure that has occurred for the two networks 120a and 120b between the master nodes $100_N$ and $\phi_{N+1}$. The master nodes $100_N$ and $100_{N+1}$ may detect this occurrence due to the master nodes $100_N$ and $100_{N+1}$ being unable to communicate with any of the nodes 140 of the networks 120a and 120b.

Other embodiments of the invention are within the scope of the appended claims. For example, the systems and techniques that are described herein may likewise be applied to a seismic data acquisition system other than a towed marine system. Furthermore, the systems and techniques that are disclosed herein may be applied to subterranean survey data acquisition systems other than seismic-based systems. For example, in accordance with other embodiments of the invention, the systems and techniques that are disclosed herein may be used in a controlled source electromagnetic (CSEM) survey systems that uses electromagnetic sources and sensors rather than seismic sources and sensors. Thus, such a system may generate a data stream that contains data acquired by an electromagnetic data acquisition network, and data may be introduced into the data stream, which describes an equipment failure in the network and which emulates data from the failed equipment. Therefore, many variations are contemplated and are within the scope of the appended claims.

As yet another variation, in accordance with some embodiments of the invention, the disclosed self-describing/emulated data systems that are described herein may be located on another component of the survey system, such as on a seismic source, for example, instead of on a streamer.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
   generating a data stream containing data acquired by a plurality of nodes of a subterranean survey data acquisition network, wherein the data stream comprises a plurality of time slots, and each time slot of the plurality of time slots is associated with a node of the plurality of nodes and is designated for communication of data for the associated node; and
   introducing data into a given time slot of the plurality of time slots describing an equipment failure in the network.

2. The method of claim 1, wherein the subterranean survey data acquisition network comprises a seismic data acquisition network.

3. The method of claim 1, wherein the subterranean survey data acquisition network is located on a seismic source of a towed marine system.

4. The method of claim 1, wherein the subterranean survey data acquisition network is located on a streamer.

5. The method of claim 1, wherein the failure prevents data from being acquired by the node associated with the given time slot, the method further comprising:
   emulating the data prevented from being acquired by the node associated with the given time slot; and
   including the emulated data in the given time slot.

6. The method of claim 1, further comprising:
   in response to the failure occurring in the network, rerouting communication in the network.

7. The method of claim 1, wherein the act of introducing the data comprises reading the data from a non-volatile memory.

8. The method of claim 1, wherein the failure comprises a failed node of the network.

9. The method of claim 1, wherein the failure comprises a physical discontinuity of the network.

10. The method of claim 1, wherein the failure comprises a powered down subnetwork of nodes of the network.

11. The method of claim 1, wherein at least some of the nodes comprise seismic sensors.

12. The method of claim 1, wherein at least some of the nodes comprise electromagnetic sensors.

13. The method of claim 1, wherein the seismic sensor cable comprises a streamer.

14. The method of claim 1, introducing the data into the given time slot further comprises introducing data that describes a failure of the node associated with the given time slot.

* * * * *